(12) United States Patent
Clements et al.

(10) Patent No.: US 9,542,354 B2
(45) Date of Patent: Jan. 10, 2017

(54) GENERATING A PARALLEL DATA SIGNAL BY CONVERTING SERIAL DATA OF A SERIAL DATA SIGNAL TO PARALLEL DATA

(71) Applicant: GLOBALFOUNDRIES Inc., Grand Cayman (KY)

(72) Inventors: Steven M. Clements, Raleigh, NC (US); John F. Ewen, Rochester, MN (US); Giri N. K. Rangan, Bangalore (IN); Shridha Tyagi, Ferozepur (IN); Arun R. Umamaheswaran, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 316 days.

(21) Appl. No.: 14/331,276

(22) Filed: Jul. 15, 2014

(65) Prior Publication Data

US 2016/0019182 A1 Jan. 21, 2016

(51) Int. Cl.
*G06F 1/00* (2006.01)
*G06F 13/42* (2006.01)
*G06F 1/08* (2006.01)

(52) U.S. Cl.
CPC ............ *G06F 13/4291* (2013.01); *G06F 1/08* (2013.01)

(58) Field of Classification Search
CPC .............................. G06F 13/4291; G06F 1/08
See application file for complete search history.

(56) References Cited

U.S. PATENT DOCUMENTS 5,726,990 A * 3/1998 Shimada ................. H03M 9/00
                                                     327/407
6,265,996 B1   7/2001 Duffy
7,342,520 B1 * 3/2008 Katzman .................. H03L 7/18
                                                     341/100

* cited by examiner

*Primary Examiner* — Zachary K Huson
(74) *Attorney, Agent, or Firm* — DeLio, Peterson & Curcio, LLC; Kelly M. Nowak

(57) ABSTRACT

Methods and deserializer circuits are provided for generating a parallel data signal by converting serial data of a serial data signal to parallel data. In a particular embodiment, the deserializer circuit includes a logic divider configured to generate based on a half rate clock, a quarter rate clock, a mode rate clock, and a selection control signal. The deserializer circuit includes a first set of latches for sampling and aligning the serial data from the serial data signal into the deserializer circuit based on the half rate clock. The deserializer circuit also includes a shift register including a second set of latches configured to latch the output of the first set of latches based on the quarter rate clock generated by the logic divider. In the particular embodiment, the deserializer circuit also includes multiplexer logic configured to output the parallel data signal including latching data from the shift register.

18 Claims, 11 Drawing Sheets

GENERATING A PARALLEL DATA SIGNAL BY CONVERTING SERIAL DATA OF A SERIAL DATA SIGNAL TO PARALLEL DATA

BACKGROUND

The present disclosure is generally related to data processing, or, more specifically, methods, apparatuses, computer program products, and deserializer circuits for generating a parallel data signal by converting serial data of a serial data signal to parallel data.

DESCRIPTION OF RELATED ART

A Serializer/Deserializer (SerDes) is a pair of functional blocks commonly used in high speed communications to compensate for limited input/output. These blocks convert data between serial data and parallel interfaces in each direction. The term "SerDes" generically refers to interfaces used in various technologies and applications. The primary use of a SerDes is to provide data transmission over a single/differential line in order to minimize the number of I/O pins and interconnects.

A deserializer is the functional block of a SerDes application and therefore is the main latency introducing element. Consequently, the components and architecture of the deserializer plays an important role in controlling the amount of power consumption and latency of the overall SerDes. In prior art, a tree architecture was used for deserialization but it is usable only for 8 bit deserialization. To get further 10 bit deserialization the 8 bit deserialised data needed to be further processed inside multiplexer logic using a divide by 10 clock. In this tree architecture example, in order to get word alignment at the final output, each bit was synched at a time after the 10 bit deserialization in the multiplexer logic, which added to the latency of the deserializer.

In an effort to reduce the latency, prior art replaced the tree architecture with a shift register based architecture. Shift register based architecture deserializers are capable of doing both 8 bit and 10 bit deserialization. Although the typical shift register based architecture added functionality, in the prior art it also added more latches and resulted in more power consumption than the tree based architecture.

SUMMARY

Methods, apparatuses, computer program products, and deserializer circuits are provided for generating a parallel data signal by converting serial data of a serial data signal to parallel data. In a particular embodiment, the deserializer circuit includes a logic divider configured to generate based on a half rate clock, a quarter rate clock, a mode rate clock, and a selection control signal. In the particular embodiment, the mode rate clock is aligned to the quarter rate clock such that each positive edge of the mode rate clock occurs between a negative edge of the quarter rate clock and the next consecutive positive edge of the quarter rate clock which follows the negative edge of the quarter rate clock. The mode rate clock is also aligned to the selection control signal such that the positive edge of the mode rate clock is after a negative edge of the quarter rate clock and before the next consecutive edge of the selection control signal which follows the negative edge of the quarter rate clock. In the particular embodiment, the deserializer circuit includes a first set of latches for sampling and aligning the serial data from the serial data signal into the deserializer circuit based on the half rate clock. The deserializer circuit also includes a shift register including a second set of latches configured to latch the output of the first set of latches based on the quarter rate clock generated by the logic divider. In the particular embodiment, the deserializer circuit also includes multiplexer logic configured to output the parallel data signal including latching data from the shift register.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
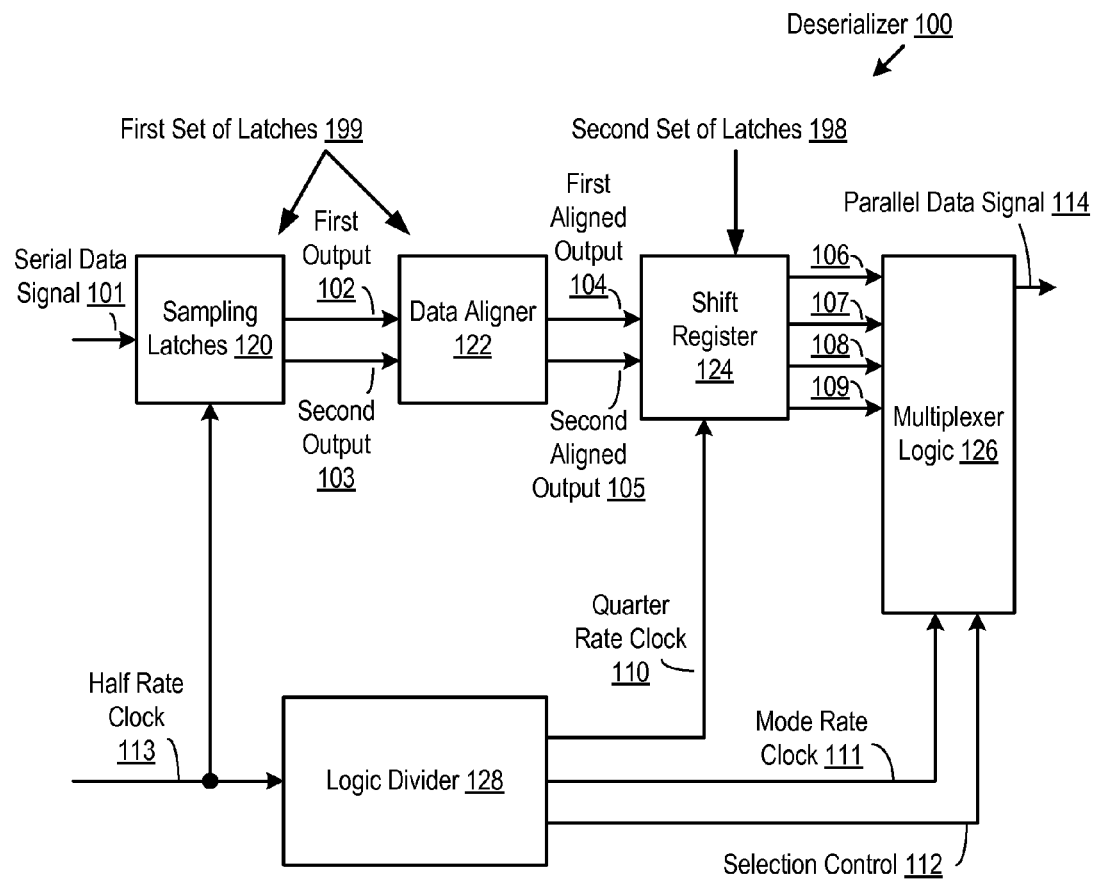
FIG. 1 is a block diagram of an embodiment of a deserializer circuit for generating a parallel data signal by converting serial data of a serial data signal to parallel data.

Example methods, apparatuses, computer program products, and deserializer circuits are provided for generating a parallel data signal by converting serial data of a serial data signal to parallel data in accordance with embodiments described herein with reference to the accompanying drawings, beginning with FIG. 1. FIG. 1 is a block diagram of an embodiment of a deserializer circuit (100) for generating a parallel data signal (114) by converting serial data of a serial data signal (101) to parallel data. The deserializer circuit (100) of FIG. 1 includes sampling latches (120), a data aligner (122), a shift register (124), multiplexer logic (126), and a logic divider (128).

The logic divider (128) of FIG. 1 is generally configured to generate signals for controlling the shift register and the multiplexer. In the example of FIG. 1, the logic divider (128) is configured to use a half rate clock (113) to generate a quarter rate clock (110), a mode rate clock (111), and a selection control signal (112). The half rate clock (113) of FIG. 1 may be provided to the logic divider (128) from another circuit, such as a clock and data recovery (CDR) circuit. CDR circuits may be implemented using phase-locked loops (PLLs).

A PLL is a control system that generates an output signal whose phase is related to the phase of an input signal. In one example, a PLL may be an electronic circuit consisting of a variable frequency oscillator and a phase detector. The oscillator of the PLL generates a periodic signal. The phase detector of the PLL compares the phase of that signal with the phase of the input periodic signal and adjusts the oscillator to keep the phases matched. Bringing the output signal back toward the input signal for comparison is called a feedback loop since the output is 'fed back' toward the input forming a loop. Keeping the input and output phase in lock step also implies keeping the input and output frequencies the same. Consequently, in addition to synchronizing signals, a phase-locked loop can track an input frequency, or it can generate a frequency that is a multiple of the input frequency. These properties are used for computer clock synchronization, demodulation, and frequency synthesis, respectively.

Phase-locked loops are widely employed in radio, telecommunications, computers and other electronic applications. They can be used to demodulate a signal, recover a signal from a noisy communication channel, generate a stable frequency at multiples of an input frequency (frequency synthesis), or distribute precisely timed clock pulses in digital logic circuits such as microprocessors.

The logic divider (128) of FIG. 1 may include a plurality of electronic components that are configured to use the half rate clock (113) to generate the quarter rate clock (110), the mode rate clock (111), and the selection control signal (112). In a particular embodiment, the logic divider (128) includes at least one frequency divider circuit. A frequency divider circuit, as called a clock divider or scaler or prescaler, is a circuit that takes an input signal of a frequency, $f_{in}$, and generates an output signal of a frequency: $f_{out}=f_{in}/n$, where n is an integer. A frequency divider circuit may utilize combinations of other circuits, such as gates and flip flops.

A flip flop or latch is a circuit that has two stable states and can be used to store state information. A flip-flop is a bistable multivibrator. The circuit can be made to change state by signals applied to one or more control inputs and will have one or two outputs. It is the basic storage element in sequential logic. Flip-flops and latches are a fundamental building block of digital electronics systems used in computers, communications, and many other types of systems.

Flip-flops and latches are often used as data storage elements. Such data storage can be used for storage of state, and such a circuit is described as sequential logic. When used in a finite-state machine, the output and next state depend not only on its current input, but also on its current state (and hence, previous inputs). It can also be used for counting of pulses, and for synchronizing variably-timed input signals to some reference timing signal.

Flip-flops can be either simple (transparent or opaque) or clocked (synchronous or edge-triggered). A clocked flip-flop typically has two inputs. One input is a control input. For example, in a D-type flip flop, the control input is labeled D. The other input is the clock. Edge-triggered flip flops may be either positive edge-triggered or negative edge-triggered. Positive edge-triggered flip flops can only change output values when the clock is at a positive edge. Said another way, a positive edge-triggered flip flop operates such that when the clock signal is not at a positive edge, then the output value is held. That is, it does not change. Conversely, negative edge-triggered flip flops only change on a negative edge. Flip flops may also be level-triggered, which change when the value is one.

A flip-flop typically has two outputs, Q and $Q^1$. The Q output is the bit that is stored. Thus, the flip flop is always outputting the one bit of information. The D flip-flop captures the value of the D-input at a definite portion of the clock cycle (such as the rising edge of the clock). The captured value then becomes the Q output. At other times, the output Q does not change. That is, the Q output will change state (toggle) every other clock.

Because flip flops can operate such that Q output changes state every other clock, flip flops as often used in frequency division circuits. For example, to create a divide-by-two counter, a clock signal may be applied to a D-type flip flop and the output of the flip flop would change state every other clock, effectively dividing the input signal by two. Chaining two D-type flip flops would result in divide-by-four counter. A divide-by-three counter may be created using a number of different combinations of flip flops and gates. One example of a divide-by-three counter includes using two D-type flips flops, with the output Q of the first flip flop coupled to the D input of the second flip flop and the output $Q^1$ of the first flip flop coupled to an input of AND gate, the output of which is coupled to the D input of the first flip flop. In this example of a divide-by-three counter, the other input of the AND gate is coupled to the $Q^1$ output of the second flip flop. The Q output of the second flip flop would then correspond to division of the input signal by three.

In the example of FIG. 1, the logic divider (128) uses one or more frequency division circuits to use the half rate clock (113) to generate the quarter rate clock (110), the mode rate clock (111), and the selection control (112). The quarter rate clock (110) of FIG. 1 is a divide-by-two signal of the half rate clock (113). For example, the logic divider (128) may apply the half rate clock (113) to a divide-by-two counter to generate a divide-by-two signal for use as the quarter rate clock (110).

The mode rate clock (111) of FIG. 1 may be equivalent to either an eighth rate clock or a twelfth rate clock depending on which mode the deserializer circuit (100) is operating. The deserializer circuit (100) of FIG. 1 is capable of operating in either an eight bit deserializer operation mode or a ten bit deserializer operation mode. During the eight bit deserializer operation mode, the mode rate clock (111) is a equivalent to an eighth rate clock. During the ten bit deserializer operation mode, the mode rate clock (111) is equivalent to an alternating eighth rate clock and a twelfth rate clock. The logic divider (128) may generate an eighth rate clock using the half rate signal by coupling two divide-by-two counters. A twelfth rate clock may be generated by applying the half rate clock to two divide-by-two counters coupled with a divide-by-three counter.

The selection control signal (112) of FIG. 1 is a divide-by-two clock of the mode rate clock. As explained above, the mode rate clock (111) alternates between an eighth rate clock and a twelfth rate clock when the deserializer (100) is operating in the ten bit deserializer operation mode. As a result of this alternating in the mode rate clock (111), the selection control signal (112) also alternates been a sixteenth rate clock and a twenty-fourth rate clock. In a particular embodiment, the logic divider (128) may create both of these signals by coupling a divide-by-two counter to the mode rate clock (111).

The logic divider (128) is also configured to align the quarter rate clock (110), the mode rate clock (111), and the selection control signal (112) with respect to each other. In a particular embodiment, the logic divider (128) is configured to align the mode rate clock (111) to the quarter rate clock (110) such that each positive edge of the mode rate clock (111) occurs between a negative edge of the quarter rate clock (110) and the next consecutive positive edge of the quarter rate clock (110) which follows the negative edge of the quarter rate clock (110). The logic divider (128) may also be configured to align the mode rate clock (111) to the selection control signal (112) such that the positive edge of the mode rate clock (111) is between a negative edge of the quarter rate clock (110) and the next consecutive edge of the selection control signal (112) which follows the negative edge of the quarter rate clock (110).

The sampling latches (120) of FIG. 1 are configured to sample the serial data of the serial data signal (101) and generate a first output (102) and a second output (103). The sampling latches (120) of FIG. 1 may include D type flip flops configured to latch and delay bits from the serial data signal (101). In a particular embodiment, the sampling latches (120) may include two separate paths of latches where each separate path of latches is configured to sample one half of the serial data signal (101) and generate a stream of data (102, 103) based on the one half of the serial data signal (101). In the example of FIG. 1, the sampling latches (120) use the half rate clock (113) to sample the serial data using both the edges of the half rate clock to provide even and odd data. For example, the sampling latches may operate such that alternating bits of the serial data are loaded into the two streams of data. In this example, a first stream (102) may include the zero bit, the second bit, the fourth bit and so on and a second stream (103) may include the first bit, the third bit, and the fifth bit and so on.

In the example of FIG. 1, the data aligner (122) is configured to align the two streams of data (102, 103) from the sampling latches (120). In a particular embodiment, the data aligner (122) is configured to align both streams of data (102, 103) to the positive edge of the half rate clock (110). The data aligner (122) of FIG. 1 is configured to output a first aligned data stream (104) and a second aligned data stream (105) as part of aligning the streams of data (102, 103) from the sampling latches.

In the example of FIG. 1, the sampling latches (120) and the data aligner (122) are illustrated as two separate modules. However in other embodiments, the sampling latches (120) and the data aligner (122) may be combined into one module. For example, the sampling latches (120) and the data aligner (122) may be referred to as a first set of latches (199) configured to sample and align the serial data from the serial data signal (101) into the deserializer circuit (100) based on the half rate clock (113).

The shift register (124) of FIG. 1 may include a second set of latches (198) configured to latch the output (104, 105) of the first set of latches based on the quarter rate clock (110) generated by the logic divider (128). In the example of FIG. 1, both edges of the quarter rate clock (110) are used such that all the data bits are latched inside the shift register (124). The shift register (124) is also configured and connected to the multiplexer logic (126) such that data stored in the shift register is available for latching by the multiplexer logic (126). In a particular embodiment, data is latched into the second set of latches (198) in the shift register (124) such that the first ten bits of a particular data sequence of the serial data are available to the multiplexer logic (126) during an entire clock cycle of the quarter rate clock (110) and that the next two bits of the particular data sequence are available to the multiplexer logic (126) for only a second half of a cycle of the quarter rate clock (110).

The multiplexer logic (126) of FIG. 1 may include latches and multiplexers configured to output the parallel data signal (114) by latching data (106, 107, 108, 109) from the shift register (124). In the example of FIG. 1, all the data bits inside the shift register (124) are multiplexed using a selection control (112) specific to the operational mode of the deserializer and the final parallel data is latched using the mode rate clock (111).

The deserializer circuit (100) of FIG. 1 is capable of operating in either an eight bit deserializer operation mode or a ten bit deserializer operation mode. During the eight bit deserializer operation mode, the mode rate clock (111) is a equivalent to an eighth rate clock and the selection control signal (112) may be zero or one. During the ten bit deserializer operation mode, the mode rate clock (111) is equivalent to an alternating eighth rate clock and a twelfth rate clock. The selection control signal (112) of FIG. 1 is a divide-by-two clock of the mode rate clock. As explained above, the mode rate clock (111) alternates between an eighth rate clock and a twelfth rate clock when the deserializer (100) is operating in the ten bit deserializer operation mode. As a result of this alternating in the mode rate clock (111), the selection control signal (112) also alternates been a sixteenth rate clock and a twenty-fourth rate clock.

The multiplexer logic (126) may be configured to sample the output of the shift registers at various points to construct the parallel data for the parallel data signal (114). Which data is sampled is also dependent upon the operational mode of the deserializer and the selection control signal. For example, during operation in the ten bit deserializer operation mode, when the mode rate clock (111) is equal to the eighth rate clock, the selection control signal (112) may be equal to zero and the multiplexer output selects D0-D9 from the shift register (124). Continuing with this example, when the mode rate clock (111) is equal to the twelfth rate clock, the selection control signal (112) may be equal to one and the multiplexer output selects D2-D11 from the shift register (124).

The arrangement of devices making up the exemplary system illustrated in FIG. 1 is for explanation, not for limitation. Data processing systems useful according to various embodiments may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated in FIG. 1.

Figure 2:
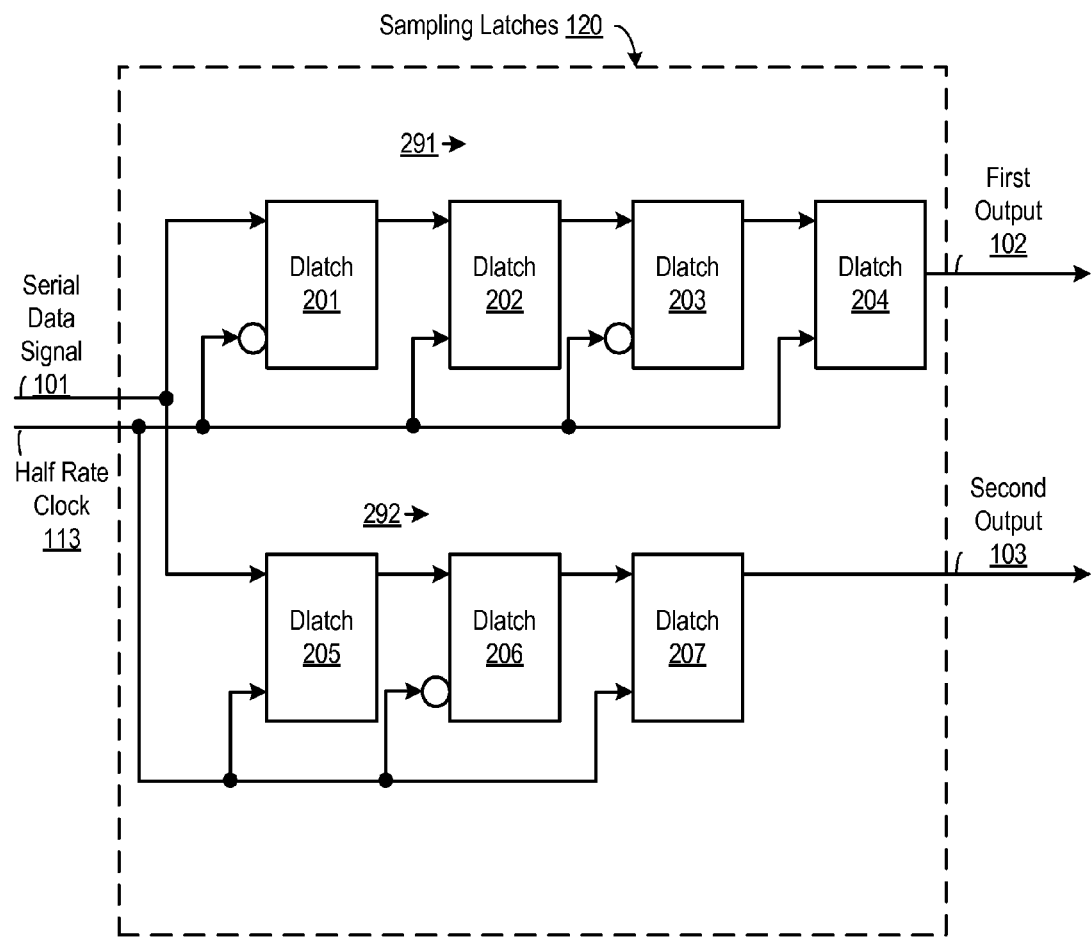
FIG. 2 is a block diagram of an embodiment of sampling latches of a deserializer circuit for generating a parallel data signal by converting serial data of a serial data signal to parallel data.

FIG. 2 sets forth a block diagram of an embodiment of sampling latches (120) of a deserializer circuit (100) for generating a parallel data signal by converting serial data of a serial data signal to parallel data. The sampling latches (120) of FIG. 2 is an example embodiment of the sampling latches (120) of FIG. 1.

The sampling latches (120) of FIG. 2 are configured to use a half rate clock (113) to sample the serial data of the serial data signal (101) and generate a first output (102) and a second output (103). The sampling latches (120) of FIG. 2 include D type flip flops (201-207) configured to latch and delay bits from the serial data signal (101). In the example of FIG. 2, the sampling latches (120) include two separate paths (291, 292) of latches where each separate path of latches is configured to sample one half of the serial data signal (101) and generate a stream of data based on the one half of the serial data signal (101). For example, alternating bits of the serial data may be loaded into the two streams of data. In this example, the first output (102) may include a first stream of data that includes the zero bit, the second bit, the fourth bit. In this example, the second output (103) may include a second stream of data that includes the first bit, the third bit, and the fifth bit and so on of the serial data.

Figure 3:
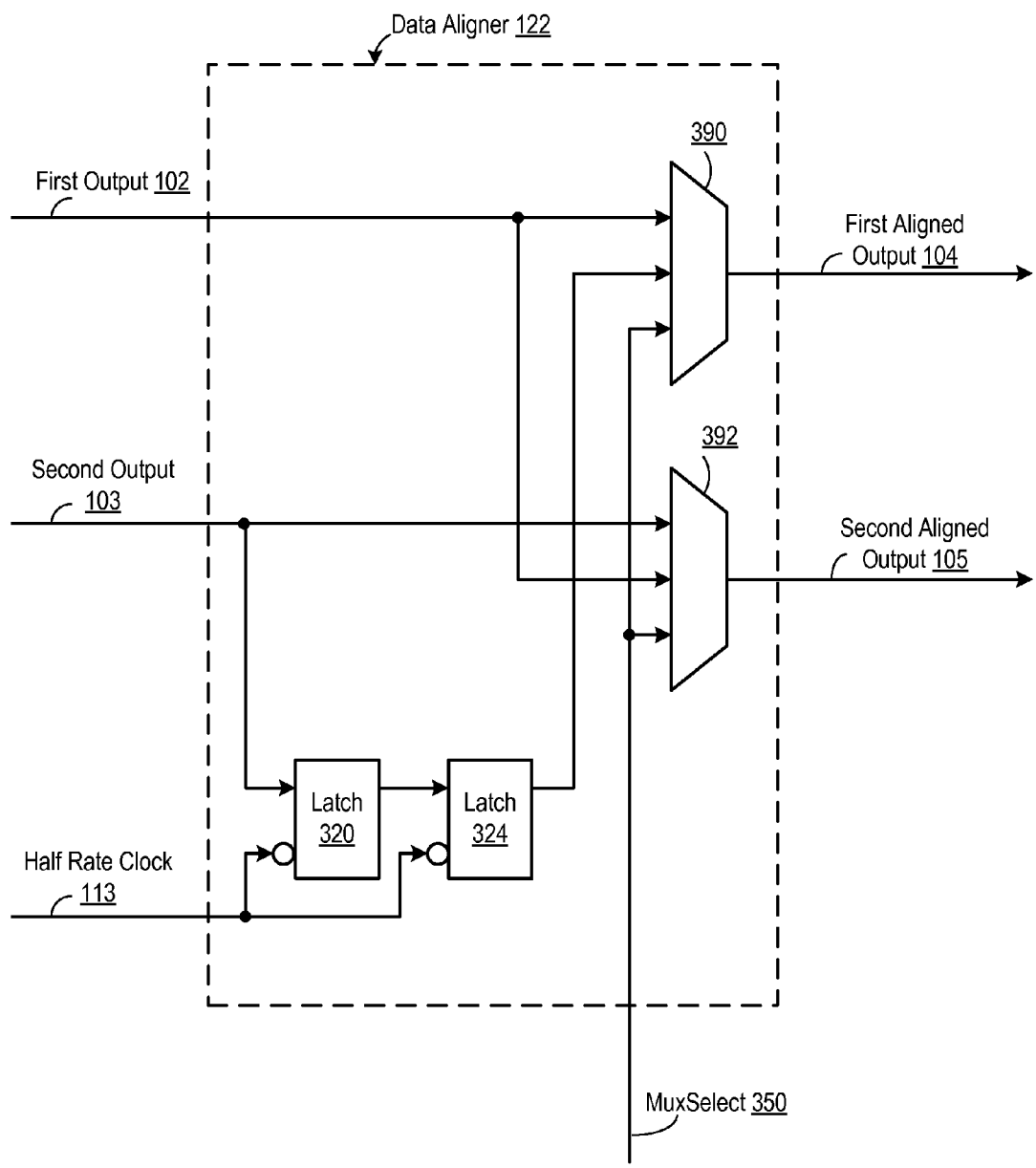
FIG. 3 is a block diagram of an embodiment of a data aligner of a deserializer circuit for generating a parallel data signal by converting serial data of a serial data signal to parallel data.

FIG. 3 is a block diagram of an embodiment of the data aligner (122) of a deserializer circuit (100) for generating a parallel data signal by converting serial data of a serial data signal to parallel data. The data aligner (122) of FIG. 3 is an example embodiment of the data aligner (122) of FIG. 3. The data aligner (122) of FIG. 3 includes a first multiplexer (390), a second multiplexer (392), a first latch (320), and a second latch (324).

In the example of FIG. 3, the data aligner (122) is configured to align two streams of data from two outputs (102, 103) from the sampling latches (120) of FIG. 1 and FIG. 2. The outputs (102, 103) from the sampling latches are provided as inputs to the first multiplexer (390) and the second multiplexer (392). The first multiplexer (390) and the second multiplexer (392) are configured to select inputs based on a multiplexer selection signal (350). In the example of FIG. 3, the first multiplexer (390) and the second multiplexer (392) use the first latch (320) and the second latch (324) to align both streams of data from the outputs (102, 103) to the positive edge of the half rate clock (113). The data aligner (122) of FIG. 3 is configured to output the first aligned data stream (104) and the second aligned data stream (105).

Figure 4:
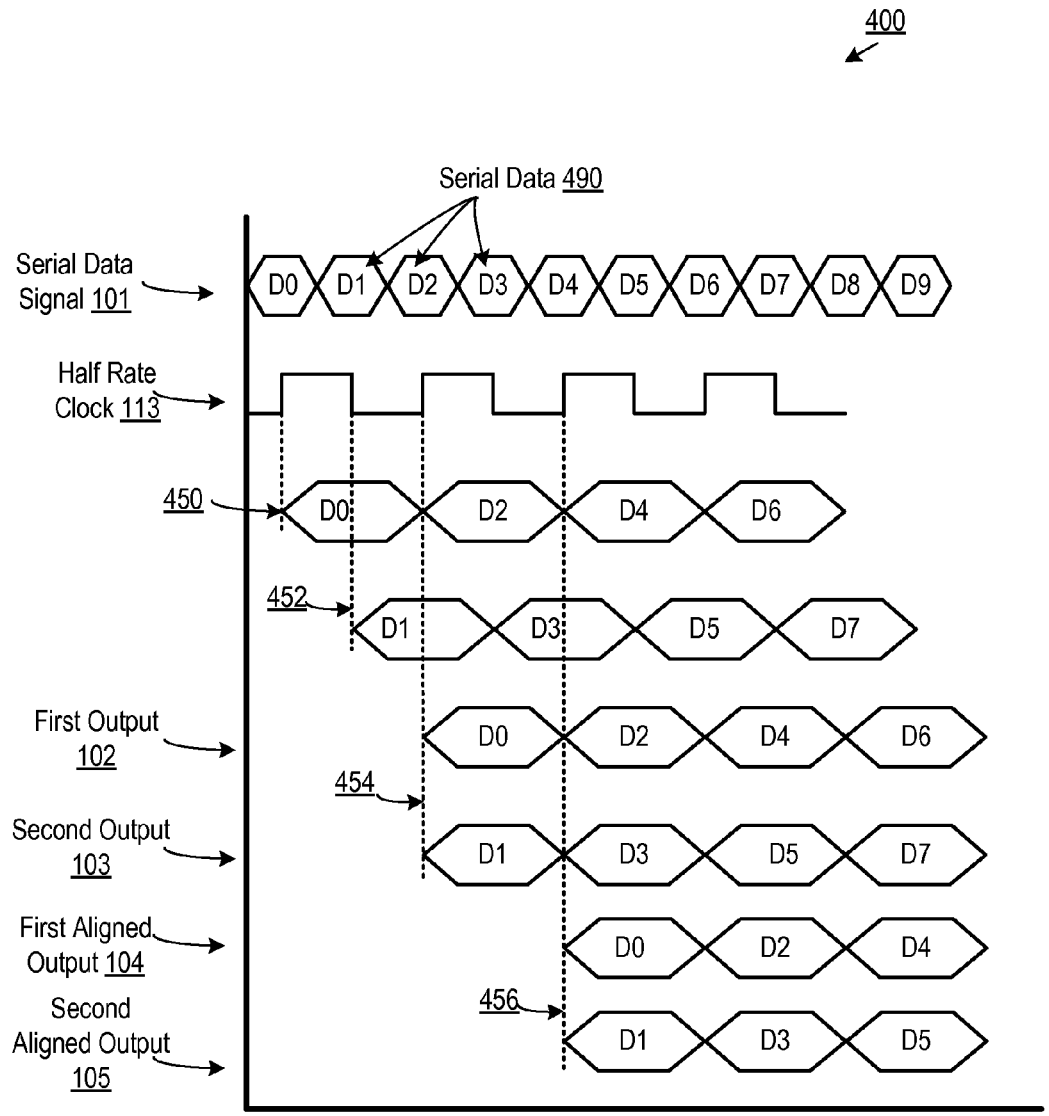
FIG. 4 is a timing diagram associated with an operation of an embodiment of sampling latches and a data aligner of a deserializer circuit for generating a parallel data signal by converting serial data of a serial data signal to parallel data.

FIG. 4 sets forth a timing diagram (400) associated with an operation of an embodiment of the sampling latches (120) and the data aligner (122) of the deserializer circuit (100) for generating a parallel data signal by converting serial data (499) of a serial data signal (101) to parallel data. The timing diagram (400) of FIG. 4 illustrates the serial data signal (101), the half rate clock (113), the first output (102) of the sampling latches (120) of FIG. 1, the second output (103) of the sampling latches (120), the first aligned data stream (104) of the data aligner, and the second aligned data stream (105) of the data aligner (122) of FIG. 1.

In the example of FIG. 4, the sampling latches (120) sample serial data (499) based on the half rate clock (113) from the serial data signal (101) and generate the first output (102) and the second output (103). As shown at the first time point (450) and the second time point (452), the sampling latches utilize both edges of the half rate clock to sample the serial data. At the first time point (450), the even bits of the serial data (490) are sampled on the positive edge of the half rate clock (113). At the second time point (452), the odd bits of the serial data (490) are sampled on the negative edge of the half rate clock (113). The first output (102) and the second output (103) are output at the third time point (454). As is illustrated at a fourth time (456), in the example of FIG. 4, the data aligner (122) also uses the half rate clock (113) to align the outputs (102, 103) from the sampling latches (120) to the positive edge of the half rate clock (113).

Figure 5:
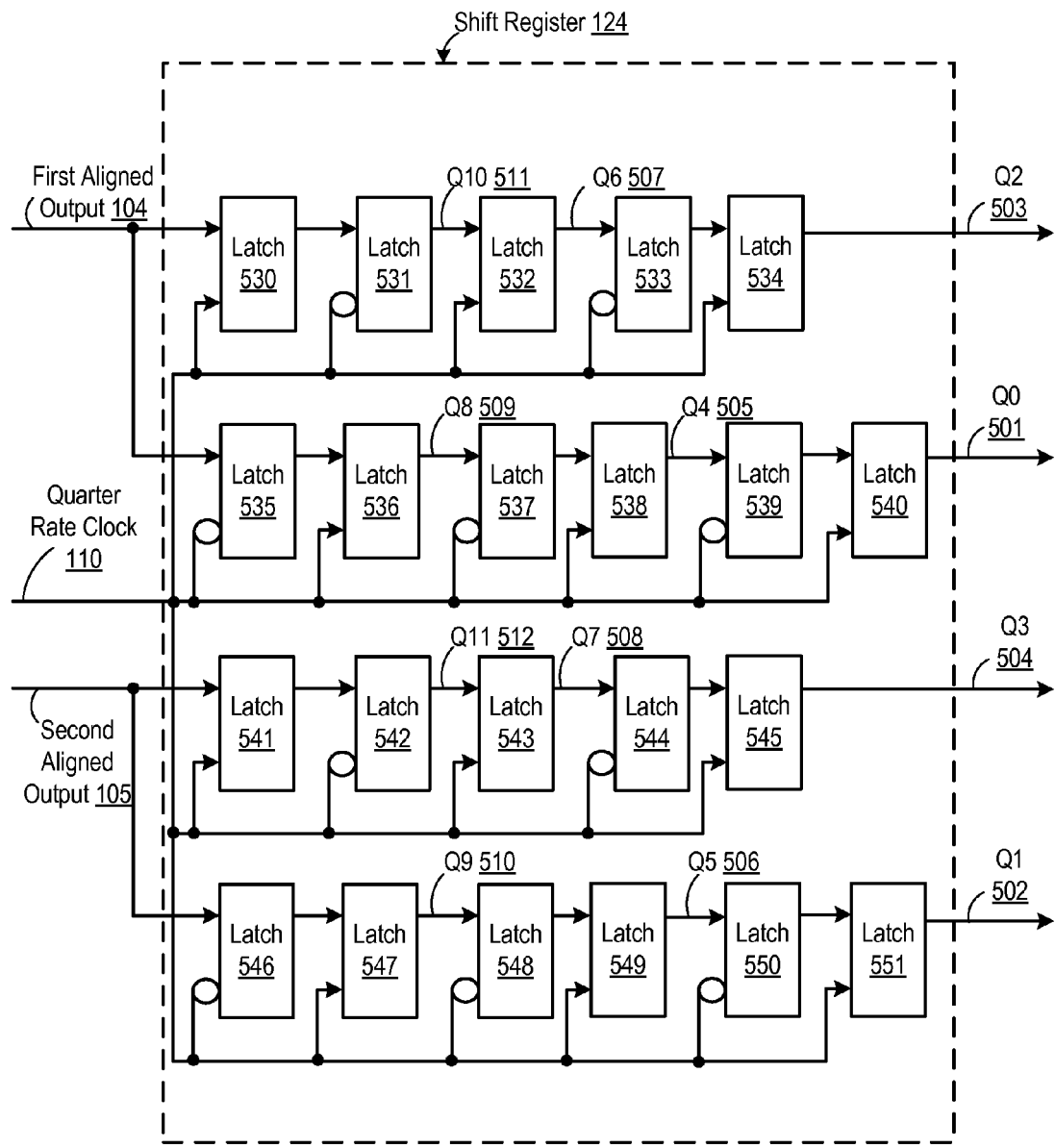
FIG. 5 is a block diagram of an embodiment of a shift register of a deserializer circuit for generating a parallel data signal by converting serial data of a serial data signal to parallel data.

FIG. 5 sets forth a block diagram of an embodiment of a shift register (124) of a deserializer circuit (100) for generating a parallel data signal by converting serial data of a serial data signal to parallel data. The shift register (124) of FIG. 5 is an example embodiment of the shift register (124) of FIG. 1. In the example of FIG. 5, the shift register (124) includes latches (530-551) for sampling, based on a quarter rate clock (110), data from the first aligned data stream (104) of the data aligner (122) of FIG. 1 and the second aligned data stream (105) of the data aligner (122) of FIG. 1.

As explained above, as data moves through the latches of the shift register (124), the multiplexer logic (126) may latch data at various points from within the shift register (124). In the example of FIG. 5, the multiplexer logic (126) of FIG. 1 is configured to latch data at point Q0 (501), point Q1 (502), point Q3 (504), point Q4 (505), point Q5 (506), point Q6 (507), point Q7 (508), point Q8 (509), point Q9 (510), point Q10 (511), and point Q11 (512).

In a particular embodiment, data is latched into the latches in the shift register (124) of FIG. 5 such that the first ten bits of a particular data sequence of the serial data are available during an entire clock cycle of the quarter rate clock (110) and that the next two bits of the particular data sequence are available for only a second half of a cycle of the quarter rate clock (110).

Figure 6:
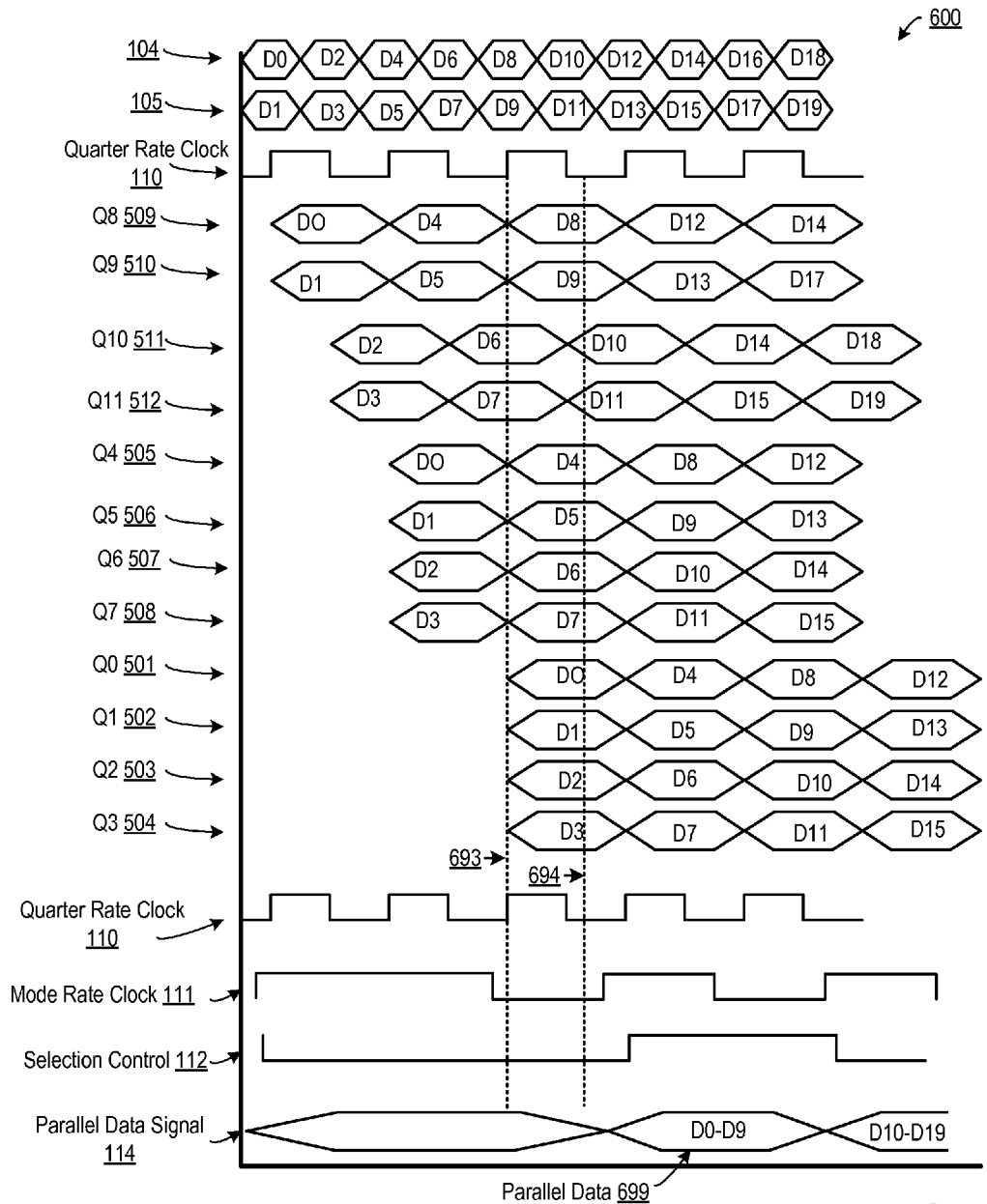
FIG. 6 is a timing diagram associated with an operation of an embodiment of a shift register and multiplexer logic of a deserializer circuit for generating a parallel data signal by converting serial data of a serial data signal to parallel data.

FIG. 6 sets forth a timing diagram (600) associated with an operation of an embodiment of the shift register (124) and the multiplexer logic (126) of a deserializer circuit (100) for generating a parallel data signal by converting serial data of a serial data signal to parallel data. The timing diagram (600) of FIG. 6 illustrates the quarter rate clock (110), the first aligned data stream (104) of the data aligner (122) of FIG. 1, the second aligned data stream (105) of the data aligner (122) of FIG. 1, the mode rate clock (111), the selection control (112), and the parallel data (699) of the parallel data signal (114).

The timing diagram (600 of FIG. 6 also illustrates the latch data at the following points within the shift register (124) of FIG. 1: point Q0 (501), point Q1 (502), point Q3 (504), point Q4 (505), point Q5 (506), point Q6 (507), point Q7 (508), point Q8 (509), point Q9 (510), point Q10 (511), and point Q11 (512). As explained above, the multiplexer logic (126) latches the data from these points in the shift register (124) using a selection control (112) specific to the operational mode of the deserializer and the final parallel data is latched using the mode rate clock (111).

According to embodiments, the deserializer circuit (100) is capable of operating in either an eight bit deserializer operation mode or a ten bit deserializer operation mode. During the eight bit deserializer operation mode, the mode rate clock (111) is equivalent to an eighth rate clock and the selection control signal (112) may be zero or one. During the ten bit deserializer operation mode, the mode rate clock (111) is equivalent to an alternating eighth rate clock and a twelfth rate clock. The selection control signal (112) of FIG. 6 is a divide-by-two clock of the mode rate clock (111). As explained above, the mode rate clock (111) alternates between an eighth rate clock and a twelfth rate clock when the deserializer (100) is operating in the ten bit deserializer operation mode. As a result of this alternating in the mode rate clock (111), the selection control signal (112) also alternates been a sixteenth rate clock and a twenty-fourth rate clock.

The multiplexer logic (126) may be configured to sample the output of the shift registers at various points to construct the parallel data for the parallel data signal (114). Which data is sampled is also dependent upon the operational mode of the deserializer and the selection control signal. For example, during operation in the ten bit deserializer operation mode, when the mode rate clock (111) is equal to the eighth rate clock, the selection control signal (112) may be equal to zero and the multiplexer output selects D0-D9 from the shift register (124). Continuing with this example, when the mode rate clock (111) is equal to the twelfth rate clock, the selection control signal (112) may be equal to one and the multiplexer output selects D2-D11 from the shift register (124).

For example, at time 1 (693) of FIG. 6, the data D0-D9 stored at points Q0-Q9 (501-510) is available for latching for an entire quarter rate clock cycle. Continuing with this example, at time 2 (694) of FIG. 6, the data D10-D11 stored at points Q10-Q11 (511-512) is only available for latching the second half cycle of the quarter rate clock (110).

Figure 7:
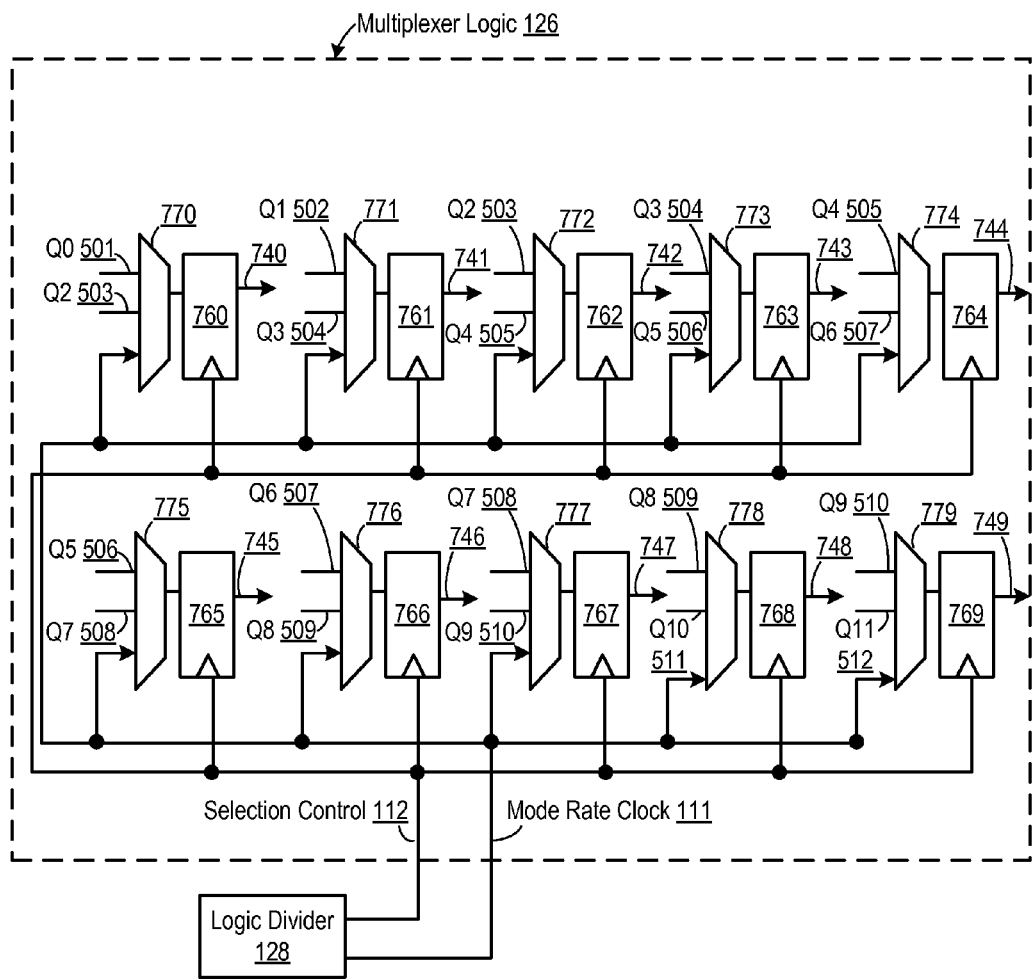
FIG. 7 is a block diagram of an embodiment of multiplexer logic of a deserializer circuit for generating a parallel data signal by converting serial data of a serial data signal to parallel data.

FIG. 7 sets forth a block diagram of an embodiment of the multiplexer logic (126) of a deserializer circuit (100) for generating a parallel data signal by converting serial data of a serial data signal to parallel data. The multiplexer logic (126) of FIG. 7 is an example embodiment of the multiplexer logic (126) of FIG. 1. In the example of FIG. 7, the multiplexer logic (126) includes multiplexers (770-779), the output of each of which is coupled to a latch (760-769).

Each of the multiplexers (770-779) of FIG. 7 has two data inputs, each of which is directly coupled to a particular point of the latches of the shift register (124) of FIG. 5. For example, the first multiplexer (770) of the multiplexer logic (126) of FIG. 7 has a first input that is coupled to point Q0 (501) of the shift register (124) of FIG. 5 and a second input that is coupled to point Q2 (503) of the shift register (124) of FIG. 5. The second multiplexer (771) of the multiplexer logic (126) of FIG. 7 has a first input that is coupled to point Q1 (502) and a second input that is coupled to point Q3 (504). The third multiplexer (772) of the multiplexer logic (126) of FIG. 7 has a first input that is coupled to point Q2 (503) and a second input that is coupled to point Q4 (505). The fourth multiplexer (773) of the multiplexer logic (126) of FIG. 7 has a first input that is coupled to point Q3 (504) and a second input that is coupled to point Q5 (506). The fifth multiplexer (774) of the multiplexer logic (126) of FIG. 7 has a first input that is coupled to point Q4 (505) and a second input that is coupled to point Q6 (507). The sixth multiplexer (775) of the multiplexer logic (126) of FIG. 7 has a first input that is coupled to point Q5 (506) and a second input that is coupled to point Q7 (508). The seventh multiplexer (776) of the multiplexer logic (126) of FIG. 7 has a first input that is coupled to point Q6 (507) and a second input that is coupled to point Q8 (509). The eighth multiplexer (777) of the multiplexer logic (126) of FIG. 7 has a first input that is coupled to point Q7 (508) and a second input that is coupled to point Q9 (510). The ninth multiplexer (778) of the multiplexer logic (126) of FIG. 7 has a first input that is coupled to point Q8 (509) and a second input that is coupled to point Q10 (511). The tenth multiplexer (779) of the multiplexer logic (126) of FIG. 7 has a first input that is coupled to point Q9 (510) and a second input that is coupled to point Q11 (512). As explained above, the multiplexer logic (126) latches the data from these points in the shift register (124) using a selection control (112) specific to the operational mode of the deserializer and the final parallel data is latched using the mode rate clock (111).

For example, during operation in the ten bit deserializer operation mode, when the mode rate clock (111) is equal to the eighth rate clock, the selection control signal (112) may be equal to zero and the multiplexer output selects D0-D9 at points Q0-Q9 from the shift register (124). Continuing with this example, when the mode rate clock (111) is equal to the twelfth rate clock, the selection control signal (112) may be equal to one and the multiplexer output selects D2-D11 at points Q2-Q11 from the shift register (124). As mentioned above, in a particular embodiment, the selection control (112), the mode rate clock (111), and the quarter rate clock (110) are aligned such that the data D0-D9 stored at points Q0-Q9 (501-510) is available for latching for an entire quarter rate clock cycle and the data D10-D11 stored at points Q10-Q11 (511-512) is only available for latching the second half cycle of the quarter rate clock (110).

Figure 8:
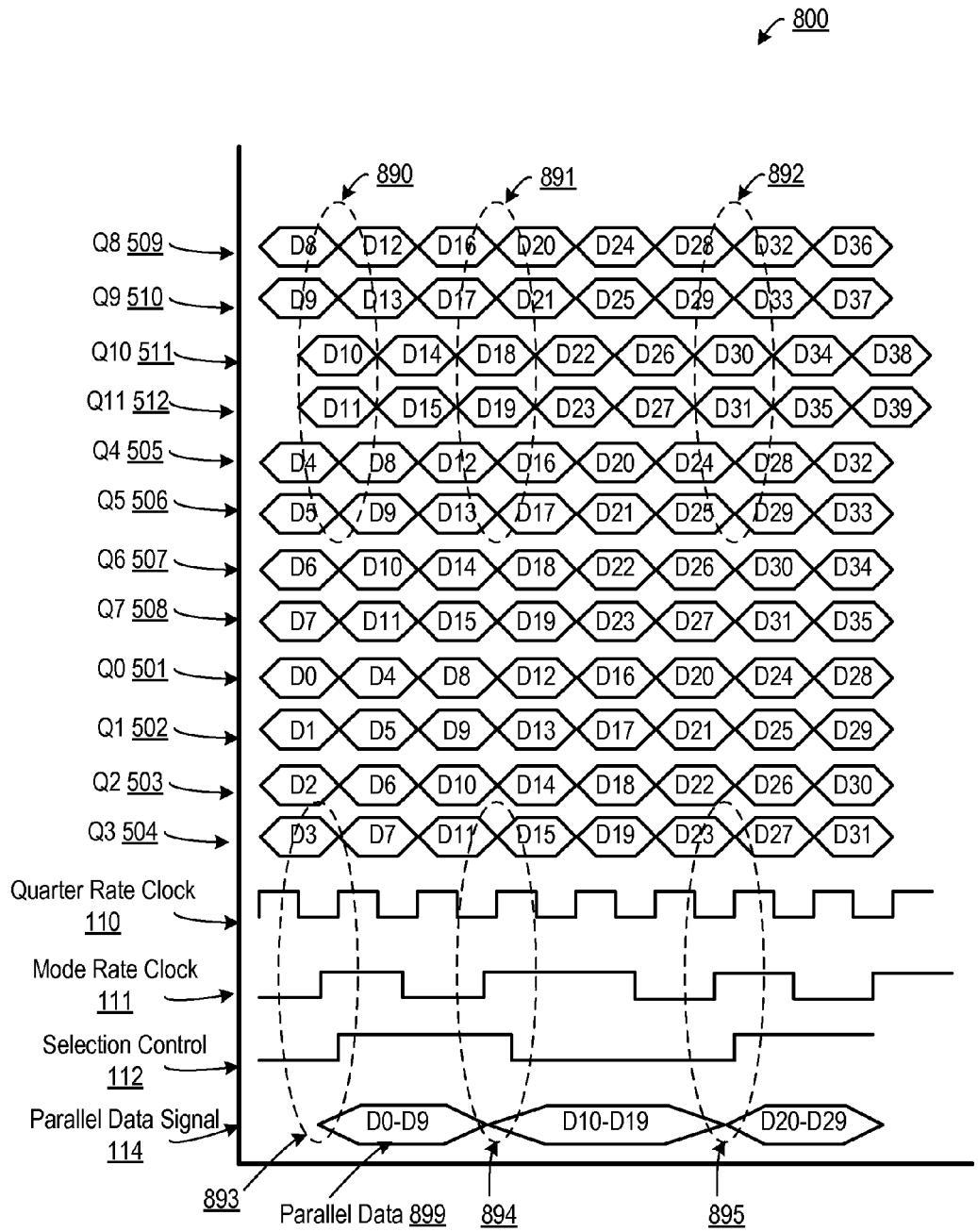
FIG. 8 is a timing diagram associated with an operation of an embodiment of a shift register and multiplexer logic of a deserializer circuit for generating a parallel data signal by converting serial data of a serial data signal to parallel data.

FIG. 8 sets forth a timing diagram (800) associated with an operation of an embodiment of a shift register (124) and multiplexer logic (126) of a deserializer circuit (100) for generating a parallel data signal by converting serial data of a serial data signal to parallel data. The timing diagram (800) of FIG. 8 illustrates the quarter rate clock (110), the mode rate clock (111), the selection control (112), and the parallel data (699) of the parallel data signal (114).

The timing diagram (800) of FIG. 8 also illustrates the latch data at the following points within the shift register (124) of FIG. 5: point Q0 (501), point Q1 (502), point Q3 (504), point Q4 (505), point Q5 (506), point Q6 (507), point Q7 (508), point Q8 (509), point Q9 (510), point Q10 (511), and point Q11 (512). As explained above, the multiplexer logic (126) latches the data from these points in the shift register (124) using a selection control (112) specific to the operational mode of the deserializer and the final parallel data is latched using the mode rate clock (111).

According to embodiments, the deserializer circuit (100) is capable of operating in either an eight bit deserializer operation mode or a ten bit deserializer operation mode. During the eight bit deserializer operation mode, the mode rate clock (111) is equivalent to an eighth rate clock and the selection control signal (112) may be zero or one. During the ten bit deserializer operation mode, the mode rate clock (111) is equivalent to an alternating eighth rate clock and a twelfth rate clock. The selection control signal (112) of FIG. 8 is a divide-by-two clock of the mode rate clock (111). As explained above, the mode rate clock (111) alternates between an eighth rate clock and a twelfth rate clock when the deserializer (100) is operating in the ten bit deserializer operation mode. As a result of this alternating in the mode rate clock (111), the selection control signal (112) also alternates been a sixteenth rate clock and a twenty-fourth rate clock.

The multiplexer logic (126) may be configured to sample the output of the shift register at various points to construct the parallel data for the parallel data signal (114). Which data is sampled is also dependent upon the operational mode of the deserializer and the selection control signal. For example, during operation in the ten bit deserializer operation mode, when the mode rate clock (111) is equal to the eighth rate clock, the selection control signal (112) may be equal to zero and the multiplexer output selects D0-D9 from the shift register (124). Continuing with this example, when the mode rate clock (111) is equal to the twelfth rate clock, the selection control signal (112) may be equal to one and the multiplexer output selects D2-D11 from the shift register (124).

For example, as is illustrated at time 1 (890) of FIG. 8, the data D0-D9 stored at points Q0-Q9 (501-510) is available for latching for an entire quarter rate clock cycle and the data D10-D11 stored at points Q10-Q11 (511-512) is only available for latching the second half cycle of the quarter rate clock (110). At time 2 (891), the data D8-D17 stored at points Q0-Q9 (501-510) is available for latching for an entire quarter rate clock cycle and the data D18-D19 stored at points Q10-Q11 (511-512) is only available for latching the second half cycle of the quarter rate clock (110). At time 3 (891), the data D20-D29 stored at points Q0-Q9 (501-510) is available for latching for an entire quarter rate clock cycle and the data D30-D31 stored at points Q10-Q11 (511-512) is only available for latching the second half cycle of the quarter rate clock (110).

As mentioned above, the quarter rate clock (110), the mode rate clock (111), and the selection control signal (112) are aligned with respect to each other. In the example of FIG. 8, at time 4 (893), time 5 (894), and time 6 (895), the mode rate clock (111) is aligned to the quarter rate clock (110) such that each positive edge of the mode rate clock (111) occurs between a negative edge of the quarter rate clock (110) and the next consecutive positive edge of the quarter rate clock (110) which follows the negative edge of the quarter rate clock (110). Furthermore, the mode rate clock (111) is aligned to the selection control signal (112) such that the positive edge of the mode rate clock (111) is between a negative edge of the quarter rate clock (110) and the next consecutive edge of the selection control signal (112) which follows the negative edge of the quarter rate clock (110).

Figure 9:
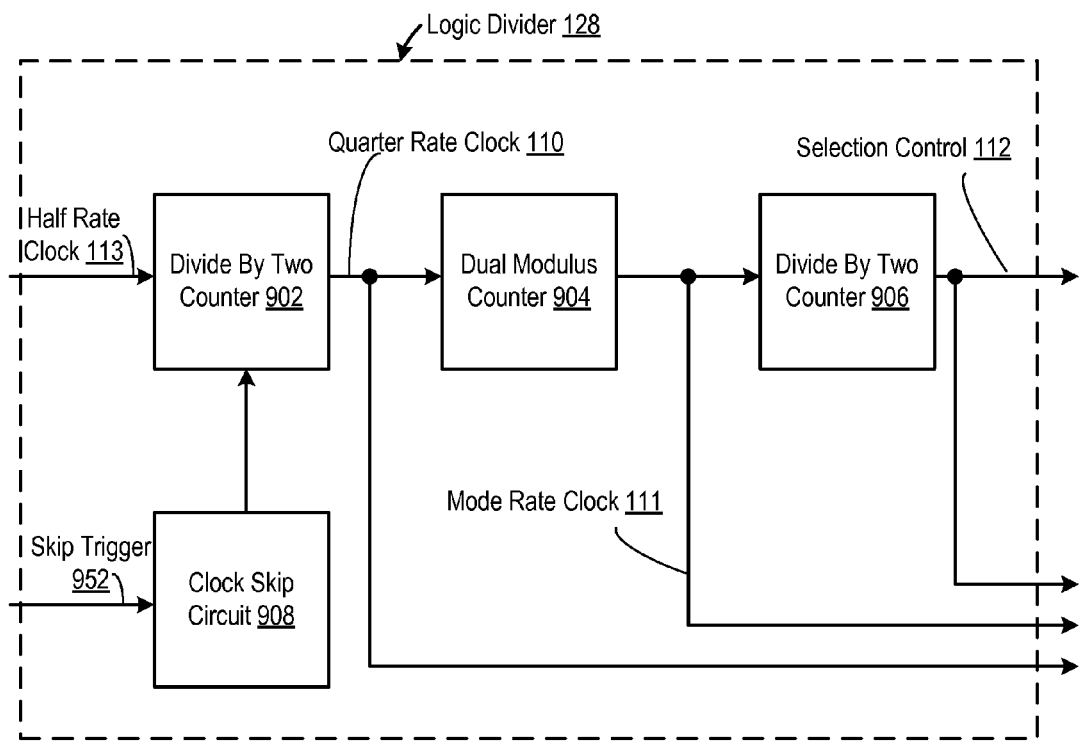
FIG. 9 is a block diagram of an embodiment of a logic divider of a deserializer circuit for generating a parallel data signal by converting serial data of a serial data signal to parallel data.

FIG. 9 sets forth a block diagram of an embodiment of a logic divider (128) of a deserializer circuit (100) for generating a parallel data signal by converting serial data of a serial data signal to parallel data. The logic divider (128) of FIG. 9 is an example embodiment of the logic divider (128) of FIG. 1. In the example of FIG. 9, the logic divider (128) includes a first divide-by-two counter (902), a dual modulus counter (904), a second divide-by-two counter (906), and a clock skip circuit (908).

The logic divider (128) of FIG. 9 is configured to use the half rate clock (113) to generate the quarter rate clock (110), the mode rate clock (111), and the selection control signal (112). As explained above, the half rate clock (113) of FIG. 9 may be provided to the logic divider (128) from another circuit, such as a clock and data recovery (CDR) circuit.

In the example of FIG. 9, the first divide-by-two counter (902) uses the half rate clock (113) to generate a divide-by-two signal for use as the quarter rate clock (110). Consequently, the quarter rate clock (110) of FIG. 9 is a divide-by-two signal of the half rate clock (113). As explained above, the mode rate clock (111) of FIG. 9 may be equivalent to either an eighth rate clock or a twelfth rate clock depending on which mode the deserializer circuit (100) is operating. The deserializer circuit (100) of FIG. 9 is capable of operating in either an eight bit deserializer operation mode or a ten bit deserializer operation mode. During the eight bit deserializer operation mode, the mode rate clock (111) is equivalent to an eighth rate clock. During the ten bit deserializer operation mode, the mode rate clock (111) is equivalent to an alternating eighth rate clock and a twelfth rate clock.

The dual modulus counter (904) is configured to use the quarter rate clock (110) to generate either an eighth rate clock or a twelfth rate clock. To generate the two signals, the dual modulus counter (904) may act as either a divide-by-two counter or a divide-by-three counter. In the example of FIG. 9, when the dual modulus counter (904) acts as a divide-by-two counter, the dual modulus counter generates a divide-by-two signal of the quarter rate clock (110), generating an eighth rate clock as the mode rate clock (111). When the dual modulus counter (904) acts as a divide-by-three counter, the dual modulus counter generates a divide-by-three signal of the quarter rate clock (110), generating a twelfth rate clock as the mode rate clock (111).

The selection control signal (112) of FIG. 9 is a divide-by-two clock of the mode rate clock. As explained above, the mode rate clock alternates between an eighth rate clock and a twelfth rate clock when the deserializer is operating in the ten bit deserializer operation mode. As a result of this alternating in the mode rate clock, the selection control signal also alternates been a sixteenth rate clock and a twenty-fourth rate clock. In the example of FIG. 9, the selection control signal (112) is generated by the second divide-by-two counter (906) generating a divide-by-two signal of the mode rate clock (111).

The logic divider (128) is also configured to align the quarter rate clock (110), the mode rate clock (111), and the selection control signal (112) with respect to each other. In a particular embodiment, the logic divider (128) is configured to align the mode rate clock (111) to the quarter rate clock (110) such that each positive edge of the mode rate clock (111) occurs between a negative edge of the quarter rate clock (110) and the next consecutive positive edge of the quarter rate clock (110) which follows the negative edge of the quarter rate clock (110). The logic divider (128) may also be configured to align the mode rate clock (111) to the selection control signal (112) such that the positive edge of the mode rate clock (111) is between a negative edge of the quarter rate clock (110) and the next consecutive edge of the selection control signal (112) which follows the negative edge of the quarter rate clock (110).

The clock skip circuit (908) of FIG. 9 is configured to swallow a pulse of the quarter rate clock (110) when a skip trigger signal (952) is received. The clock skip circuit may be referred to as a pulse-swallowing counter. Pulse-swallowing counters are typical components in all-digital feedback systems. The overall pulse-swallowing system is used as part of a fractional-N frequency divider. The overall pulse-swallowing system cancels beatnotes created when switching between N, N+1, or N−1 in a fractional-N synthesizer.

Figure 10:
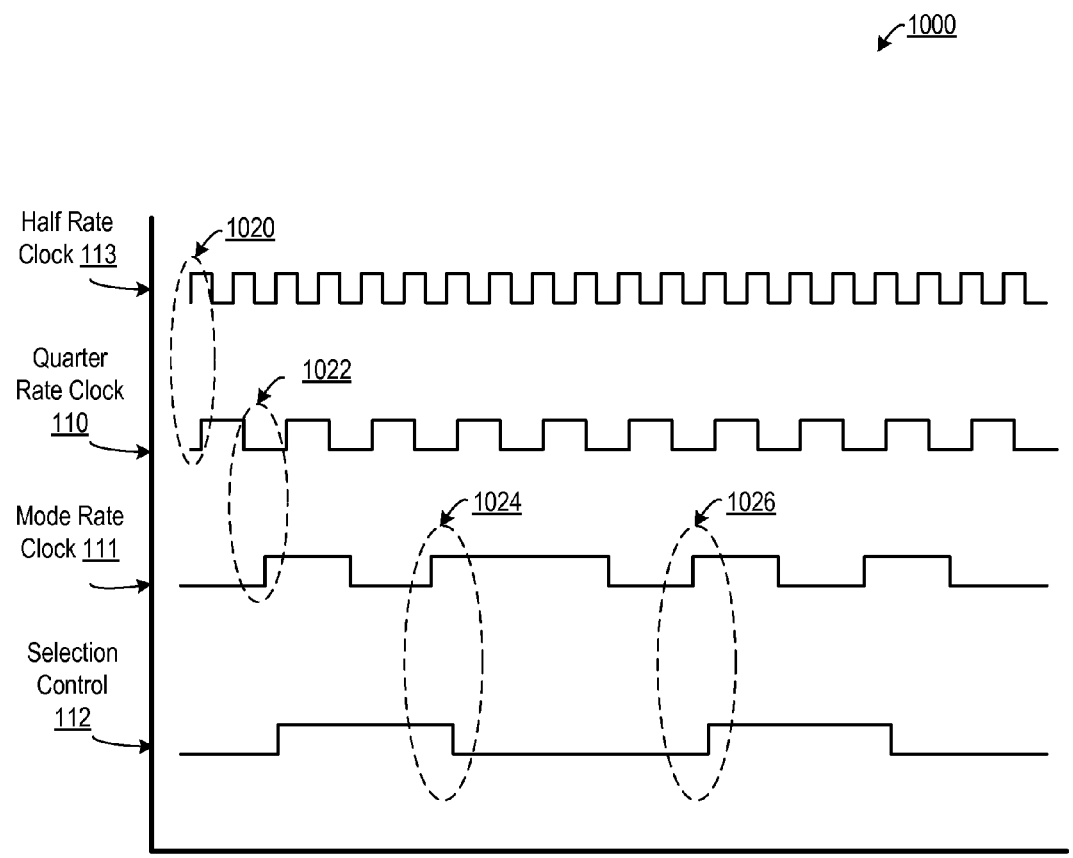
FIG. 10 is a timing diagram associated with an operation of an embodiment of a logic divider of a deserializer circuit for generating a parallel data signal by converting serial data of a serial data signal to parallel data.

FIG. 10 is a timing diagram (1000) associated with an operation of an embodiment of a logic divider (128) of a deserializer circuit (100) for generating a parallel data signal by converting serial data of a serial data signal to parallel data. The timing diagram (1000) of FIG. 10 illustrates the half rate clock (113), the quarter rate clock (110), the mode rate clock (111), and the selection control (112).

As explained above, alignment between the half rate clock (113), the quarter rate clock (110), the mode rate clock (111), and the selection control signal (112) may an important role in the proper latching of data within the deserializer (100). At time 1 (1020), the positive edge of the quarter rate clock (110) is aligned to the positive edge of the half rate clock (113). At time 2 (1022), the mode rate clock (111) is aligned to the negative edge of the quarter rate clock (110) to ensure that all the data bits from points Q0-Q11 of the shift register can be latched properly by the mode rate clock (111) into the multiplexer logic (126). At time 3 (1024) and time 4 (1026), the selection control signal (112) is aligned to the positive edge of the mode rate clock (111) and is delayed such that the positive edge of the mode rate clock (111) stays between the negative edge of the quarter rate clock and the edge of the selection control signal (112) across corners.

Figure 11:
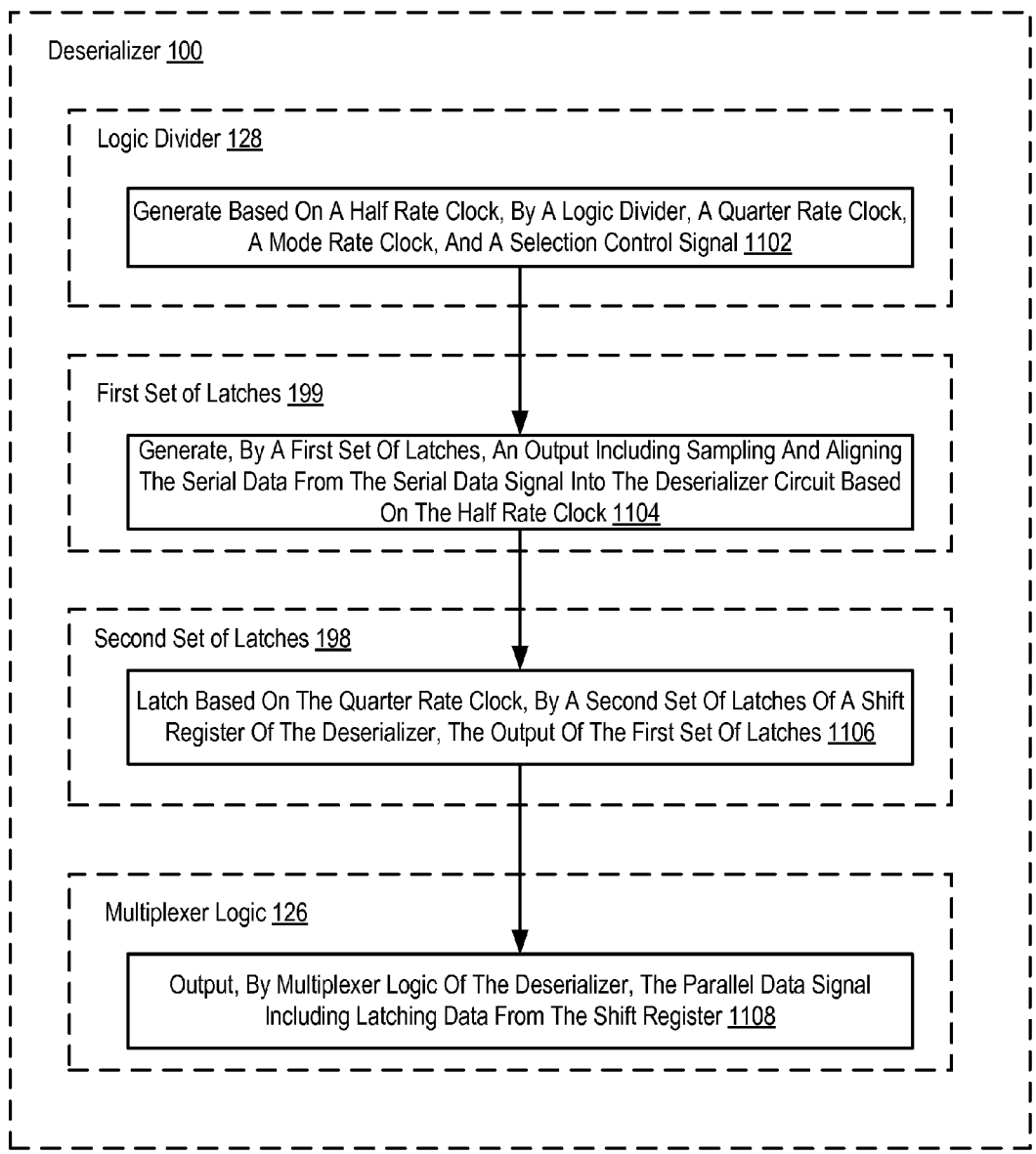
FIG. 11 sets forth a flow diagram of an embodiment of a method for generating a parallel data signal by converting serial data of a serial data signal to parallel data.

FIG. 11 sets forth a flow diagram of an embodiment of a method for generating a parallel data signal by converting serial data of a serial data signal to parallel data. For ease of explanation, the components of the deserializer (100) of FIG. 1 are referenced in explaining the method of FIG. 11.

The method of FIG. 11 includes a logic divider (128) of a deserializer (100) generating (1102) based on a half rate clock (113), a quarter rate clock (110), a mode rate clock (111), and a selection control signal (112). Generating (1102) based on a half rate clock (113), a quarter rate clock (110), a mode rate clock (111), and a selection control signal (112) may be carried out using one or more frequency division circuits, such as divide-by-two counters and divide-by-three counters.

In a particular embodiment, the mode rate clock (111) is aligned to the quarter rate clock (110) such that each positive edge of the mode rate clock (111) occurs between a negative edge of the quarter rate clock (110) and the next consecutive positive edge of the quarter rate clock (110) which follows the negative edge of the quarter rate clock (110). In a particular embodiment, the mode rate clock (111) is aligned to the selection control signal (112) such that the positive edge of the mode rate clock (111) is after a negative edge of the quarter rate clock (110) and before the next consecutive edge of the selection control signal (112) which follows the negative edge of the quarter rate clock (110).

The method of FIG. 11 includes a first set of latches (199) latching (1104) an output including sampling and aligning, the serial data from the serial data signal into the deserializer circuit (100) based on the half rate clock (113). Latching (1104) an output including sampling and aligning, the serial data from the serial data signal into the deserializer circuit (100) based on the half rate clock (113) may be carried out by a plurality of d type flip flops configured to latch and delay bits from the serial data signal. In a particular embodiment, the sampling latches (120) may include two separate paths of latches where each separate path of latches is configured to sample one half of the serial data signal (101) and generate a stream of data (102, 103) based on the one half of the serial data signal (101). For example, the sampling latches (120) may use the half rate clock (113) to sample the serial data using both the edges of the half rate clock to provide even and odd data. The sampling latches may operate such that alternating bits of the serial data are loaded into the two streams of data. In this example, a first stream (102) may include the zero bit, the second bit, the fourth bit and so on and a second stream (103) may include the first bit, the third bit, and the fifth bit and so on.

The method of FIG. 11 includes a second set of latches (198) of a shift register (124) of the deserializer (100) latching (1106) based on the quarter rate clock (110), the output of the first set of latches (199). Latching (1106) based on the quarter rate clock (110), the output of the first set of latches (199) may be carried out by using both edges of the quarter rate clock (110) to latch data bits. In a particular embodiment, data is latched into the second set of latches (198) in the shift register (124) such that the first ten bits of a particular data sequence of the serial data are available to the multiplexer logic (126) during an entire clock cycle of the quarter rate clock (110) and that the next two bits of the particular data sequence are available to the multiplexer logic (126) for only a second half of a cycle of the quarter rate clock (110).

The method of FIG. 11 includes multiplexer logic (126) of the deserializer (100) outputting (1108) the parallel data signal (114) including latching data from the shift register (124). Outputting (1108) the parallel data signal (114) including latching data from the shift register (124) may be carried out by using a plurality of latches and multiplexers to latch the data from the shift registers. In a particular embodiment, the multiplexer logic uses a selection control (112) specific to the operational mode of the deserializer and uses the mode rate clock (111) to latch the final data as the parallel data signal.

Exemplary embodiments described herein are described largely in the context of a fully functional computer system for generating a parallel data signal by converting serial data of a serial data signal to parallel data. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

Embodiments may include a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A deserializer circuit for generating a parallel data signal by converting serial data of a serial data signal to parallel data, the parallel data signal including one of: eight bits of parallel data and ten bits of parallel data, the deserializer circuit including:
    a logic divider configured to generate based on a half rate clock, a quarter rate clock, a mode rate clock, and a selection control signal; wherein the mode rate clock is aligned to the quarter rate clock such that each positive edge of the mode rate clock occurs between a negative edge of the quarter rate clock and the next consecutive positive edge of the quarter rate clock which follows the negative edge of the quarter rate clock;
    wherein the mode rate clock is aligned to the selection control signal such that the positive edge of the mode rate clock is after a negative edge of the quarter rate clock and before the next consecutive edge of the selection control signal which follows the negative edge of the quarter rate clock;
    a first set of latches for sampling and aligning the serial data from the serial data signal into the deserializer circuit based on the half rate clock;
    a shift register including a second set of latches configured to latch the output of the first set of latches based on the quarter rate clock generated by the logic divider; and
    multiplexer logic configured to output the parallel data signal including latching data from the shift register, wherein data is latched into the second set of latches in the shift register such that the first ten bits of a particular data sequence of the serial data are available during an entire clock cycle of the quarter rate clock and that the next two bits of the particular data sequence are available for only a second half of a cycle of the quarter rate clock.

2. The deserializer circuit of claim 1 wherein the first set of latches include sampling latches with two separate paths of latches, each separate path of latches configured to:
   sample one half of the serial data signal; and
   generate a stream of data based on the one half of the serial data signal.

3. The deserializer circuit of claim 2 wherein the first set of latches include a data aligner, wherein the data aligner is configured to align the two streams of data from the sampling latches.

4. The deserializer circuit of claim 3 wherein both streams of data are aligned to the positive edge of the half rate clock.

5. The deserializer circuit of claim 1 wherein the logic divider includes a first divide-by-two counter to generate the quarter rate clock and a second divide/by-two counter/divide-by-three counter to generate an eighth rate clock and a twelfth rate clock.

6. The deserializer circuit of claim 1 wherein the mode rate clock is an eighth rate clock during an eight bit deserialization operation mode of the deserializer; wherein the mode rate clock alternates between an eighth rate clock and a twelfth rate clock during a ten bit deserialization operation mode of the deserializer.

7. The deserializer circuit of claim 1 wherein during an eight bit deserialization operation mode of the deserializer, the selection control is one; wherein during a ten bit deserialization operation mode of the deserializer, the selection control is one when the mode rate clock is an eighth rate clock and the selection control is zero when the mode rate clock is a twelfth rate clock.

8. A method of generating a parallel data signal by converting serial data of a serial data signal to parallel data, the parallel data signal including one of: eight bits of parallel data and ten bits of parallel data, the method comprising:
   generating based on a half rate clock, by a logic divider of the deserializer, a quarter rate clock, a mode rate clock, and a selection control signal; wherein the mode rate clock is aligned to the quarter rate clock such that each positive edge of the mode rate clock occurs between a negative edge of the quarter rate clock and the next consecutive positive edge of the quarter rate clock which follows the negative edge of the quarter rate clock;
   wherein the mode rate clock is aligned to the selection control signal such that the positive edge of the mode rate clock is after a negative edge of the quarter rate clock and before the next consecutive edge of the selection control signal which follows the negative edge of the quarter rate clock;
   generating, by a first set of latches, an output including sampling and aligning, the serial data from the serial data signal into the deserializer circuit based on the half rate clock;
   latching based on the quarter rate clock, by a second set of latches of a shift register of the deserializer, the output of the first set of latches; and
   outputting, by multiplexer logic of the deserializer, the parallel data signal including latching data from the shift register,
wherein data is latched into the second set of latches in the shift register such that the first ten bits of a particular data sequence of the serial data are available during an entire clock cycle of the quarter rate clock and that the next two bits of the particular data sequence are available for only a second half of a cycle of the quarter rate clock.

9. The method of claim 8 wherein the first set of latches include sampling latches with two separate paths of latches, each separate path of latches configured to:
   sample one half of the serial data signal; and
   generate a stream of data based on the one half of the serial data signal.

10. The method of claim 9 wherein the first set of latches include a data aligner, wherein the data aligner is configured to align the two streams of data from the sampling latches.

11. The method of claim 10 wherein both streams of data are aligned to the positive edge of the half rate clock.

12. The method of claim 8 wherein the logic divider includes a first divide-by-two counter to generate the quarter rate clock and a second divide-by-two counter/divide-by-three counter to generate an eighth rate clock and a twelfth rate clock.

13. The method of claim 8 wherein the mode rate clock is an eighth rate clock during an eight bit deserialization operation mode of the deserializer; wherein the mode rate clock alternates between an eighth rate clock and a twelfth rate clock during a ten bit deserialization operation mode of the deserializer.

14. The method of claim 8 wherein during an eight bit deserialization operation mode of the deserializer, the selection control is one; wherein during a ten bit deserialization operation mode of the deserializer, the selection control is one when the mode rate clock is an eighth rate clock and the selection control is zero when the mode rate clock is a twelfth rate clock.

15. A deserializer circuit for generating a parallel data signal by converting serial data of a serial data signal to parallel data, the parallel data signal including one of: eight bits of parallel data and ten bits of parallel data, the deserializer circuit including:
   a logic divider configured to generate based on a half rate clock, a quarter rate clock, a mode rate clock, and a selection control signal; wherein the mode rate clock is aligned to the quarter rate clock such that each positive edge of the mode rate clock occurs between a negative edge of the quarter rate clock and the next consecutive positive edge of the quarter rate clock which follows the negative edge of the quarter rate clock;
   wherein the mode rate clock is aligned to the selection control signal such that the positive edge of the mode rate clock is after a negative edge of the quarter rate clock and before the next consecutive edge of the selection control signal which follows the negative edge of the quarter rate clock;
   a first set of latches for sampling and aligning the serial data from the serial data signal into the deserializer circuit based on the half rate clock;
   a shift register including a second set of latches configured to latch the output of the first set of latches based on the quarter rate clock generated by the logic divider; and
   multiplexer logic configured to output the parallel data signal including latching data from the shift register.

16. The deserializer circuit of claim 1 wherein the first set of latches include sampling latches with two separate paths of latches, each separate path of latches configured to:
   sample one half of the serial data signal; and
   generate a stream of data based on the one half of the serial data signal.

17. The deserializer circuit of claim 1 wherein the logic divider includes a first divide-by-two counter to generate the quarter rate clock and a second divide/by-two counter/divide-by-three counter to generate an eighth rate clock and a twelfth rate clock.

18. The deserializer circuit of claim 1 wherein the mode rate clock is an eighth rate clock during an eight bit deserialization operation mode of the deserializer; wherein the mode rate clock alternates between an eighth rate clock and a twelfth rate clock during a ten bit deserialization operation mode of the deserializer.

* * * * *